May 7, 1940.  A. L. LUCE  2,199,886
STRUCTURAL STEEL VEHICLE BODY
Filed May 16, 1938  3 Sheets-Sheet 2
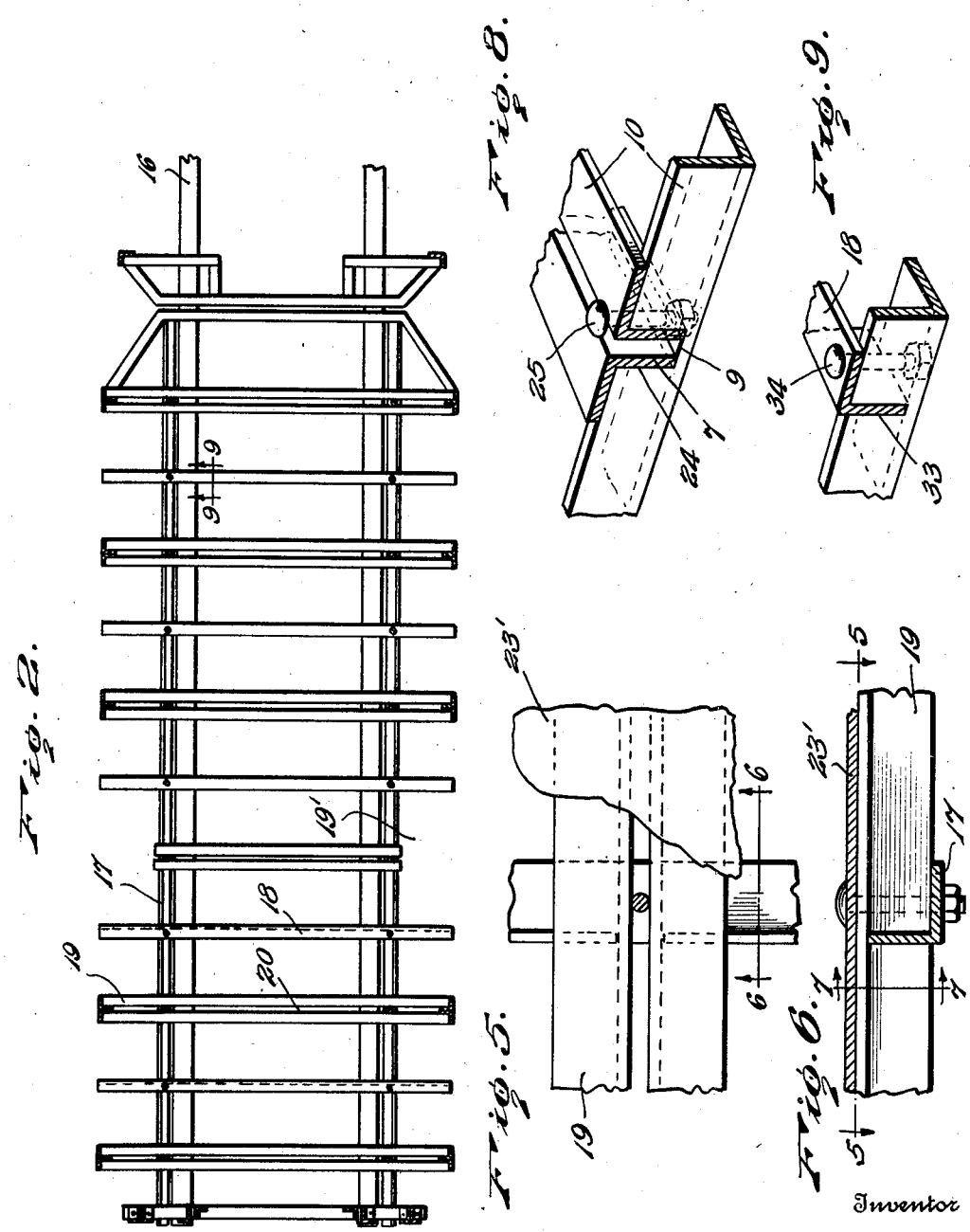
Inventor
A. L. Luce.
By Lacey & Lacey, Attorneys

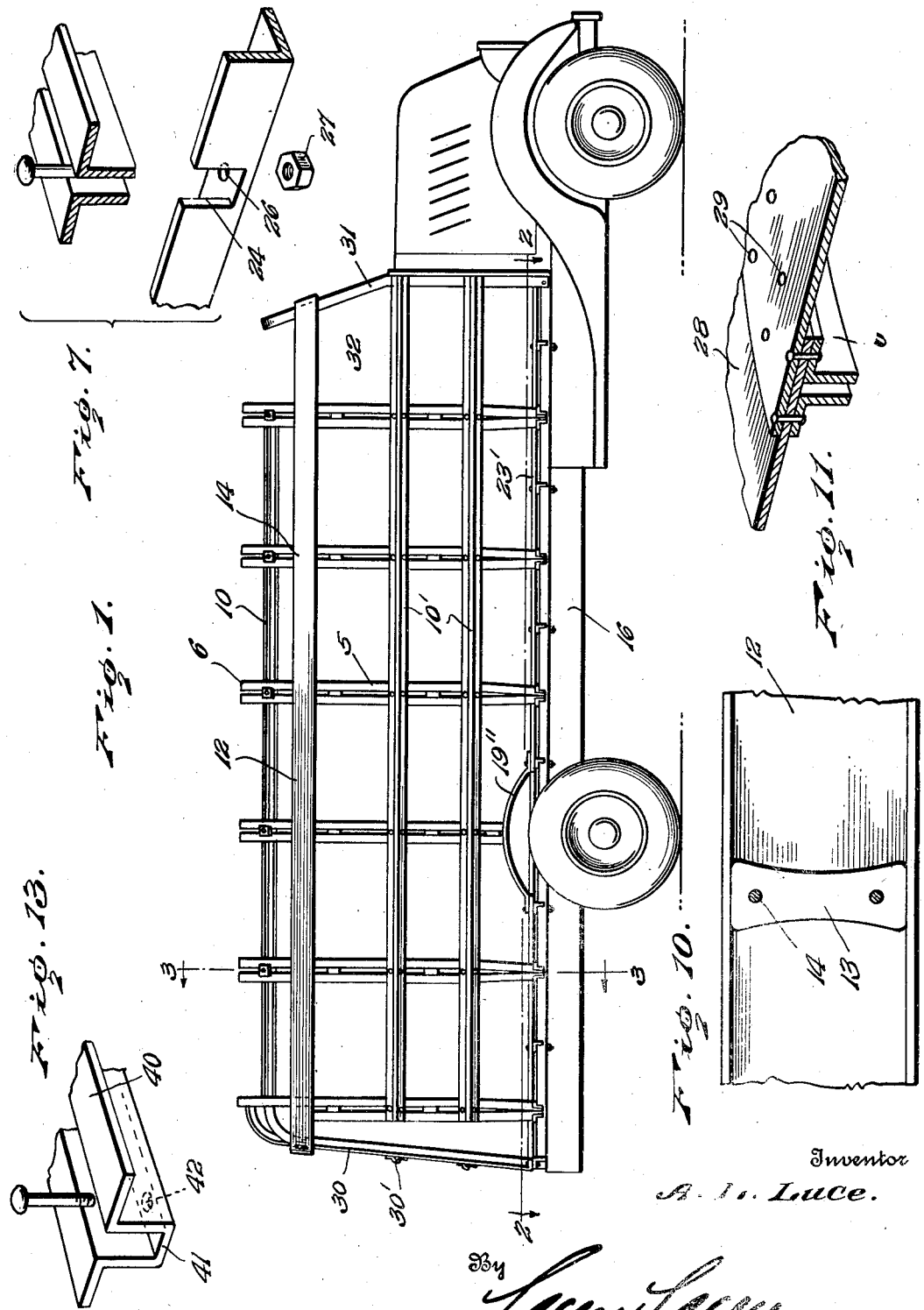

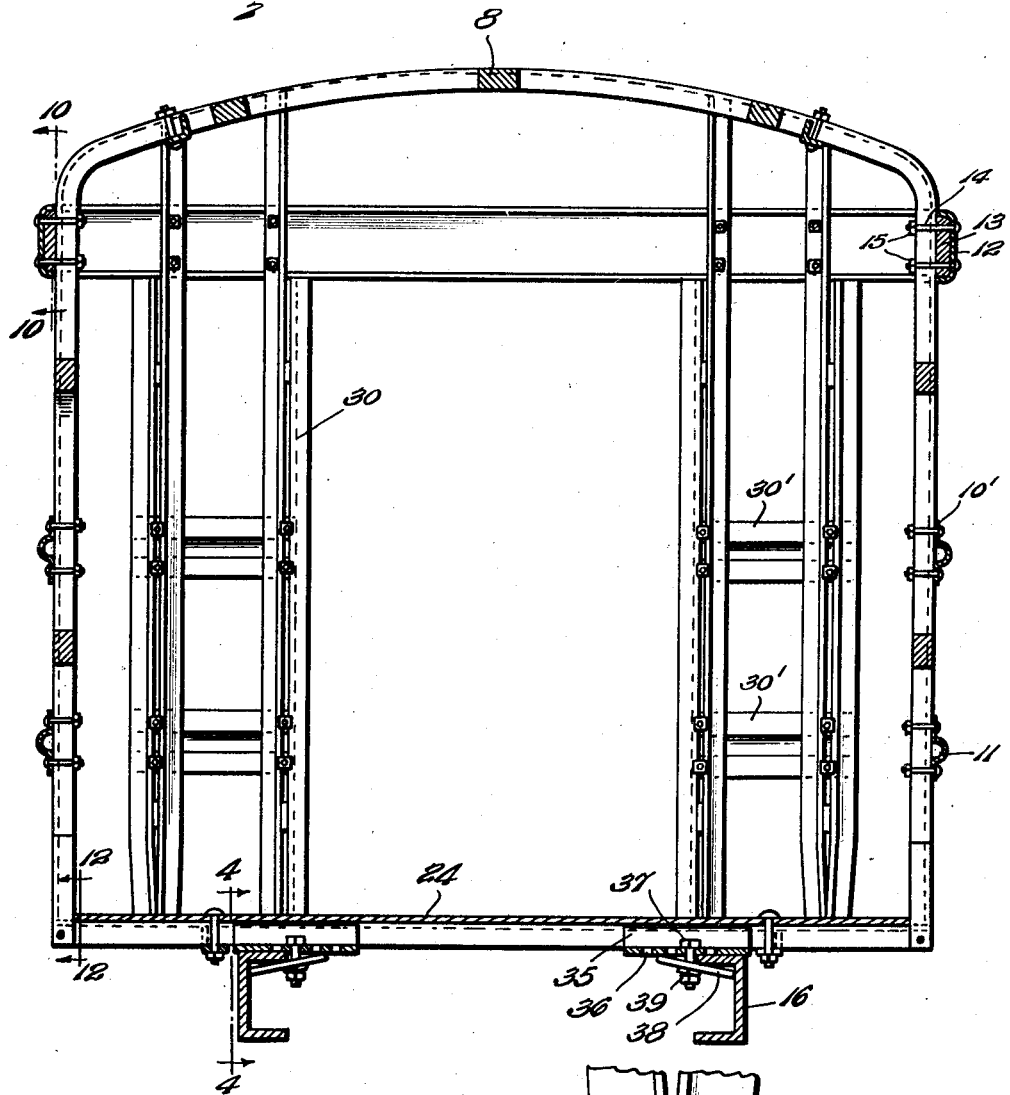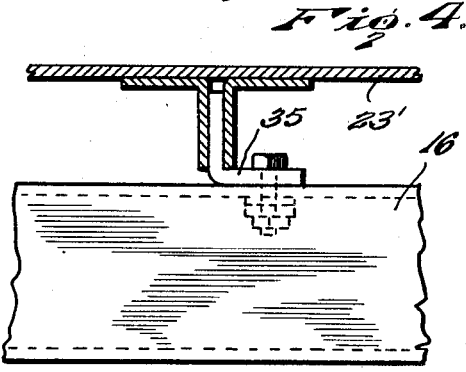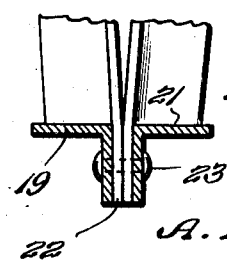

Patented May 7, 1940

2,199,886

UNITED STATES PATENT OFFICE 2,199,886

STRUCTURAL STEEL VEHICLE BODY

Albert L. Luce, Fort Valley, Ga.

Application May 16, 1938, Serial No. 208,288

4 Claims. (Cl. 296—28)

This invention relates to automobile body construction and more particularly to a steel body construction for motor buses, trucks and other conveyances.

The object of the invention is to provide a truck body fabricated from structural steel and so constructed as to permit the individual units thereof to be quickly assembled and securely fastened together by unskilled laborers, thereby dispensing with the services of skilled mechanics and consequently effecting a material saving in the cost of production.

A further object of the invention is to provide a steel truck body which is strong and durable in construction and which will effectually resist crushing and shearing strains or stresses so that in case of collision or accidental overturning of the bus or truck liability of injury to the occupants thereof will be reduced to a minimum.

A further object is to provide a novel form of joint for securing the angle bars or structural units together without the use of rivets or spot welding and further to provide a novel top and floor construction for the motor bus or truck.

A further object is to provide adjustable means for anchoring the steel body to the chassis of the truck and means for reinforcing and strengthening the top rail of said truck.

Further objects and advantages will appear in the following specification.

In the accompanying drawings forming a part of this specification and in which similar numerals of reference indicate corresponding parts in all the figures of the drawings:

Figure 1 is a side elevation of a structural steel truck body embodying the present invention, Figure 2 is a horizontal sectional view taken on the line 2—2 of Figure 1 with the flooring of the truck removed, Figure 3 is a transverse sectional view taken on the line 3—3 of Figure 1, Figure 4 is a vertical sectional view taken on the line 4—4 of Figure 3 showing the manner of adjustably anchoring the steel body to the truck chassis, Figure 5 is a horizontal sectional view taken on the line 5—5 of Figure 6, the floor being broken away to show the construction of the joint, Figure 6 is a transverse sectional view taken on the line 6—6 of Figure 5, Figure 7 is a perspective view of the joint for uniting the structural units, the parts constituting the joint being separated to more clearly show the construction thereof, Figure 8 is a perspective view partly in section of the assembled joint, Figure 9 is a transverse sectional view taken on the line 9—9 of Figure 2, Figure 10 is an enlarged rear elevation of a portion of the top rail showing the reinforcing block or casting for strengthening the same, Figure 11 is a detail transverse sectional view showing the manner of securing the top or cover plates of the truck to the structural beams, Figure 12 is an enlarged vertical sectional view taken on the line 12—12 of Figure 3, and Figure 13 is a detail perspective view showing a modified form of standard and top bow.

The improved truck body forming the subject-matter of the present invention is preferably formed of structural steel, as shown, and comprises spaced side standards 5 connected by transversely disposed integral top bows 6. The standards 5 and top bows 6 are each formed of mating L irons, the inner flanges 7 of which are disposed parallel with each other and spaced apart by filler blocks 8 or by spot welding the angle irons at predetermined intervals so as to form an intermediate groove or channel 9. The standards 5 are connected by upper longitudinal bars 10 and intermediate bars 10', portions of said intermediate bars being concavo-convex in cross section, as indicated at 11, and constituting bumpers to prevent injury to the truck when in use. Spaced from the upper longitudinal bar 10 is a top rail 12 formed of channel iron and disposed at spaced intervals within the hollow portion of the rail are reinforcing blocks or castings 13 which serve to strengthen said top rail. The top rail is secured to the standards 5 by means of bolts 14 which pass through the channels 9 of the standards and are provided with terminal nuts 15. The bottom of the truck rests upon a chassis 16 and consists of longitudinally disposed angle bars 17 also preferably L-shaped in cross section and connected at spaced intervals by transverse angle bars 18. The lower ends of the standards 5 are connected by transverse L-shaped bars 19 spaced apart to form an intermediate channel 20, one of said transverse bars 19 being shorter than the other bars to provide oppositely disposed openings 19' in the bottom of the truck to accommodate the rear wheels and wheel guards, indicated at 19''. The flanges of the angle bars constituting the standards 5 are cut away at their lower ends to form shoulders 21 defining depending fingers 22 which extend within the channels 20 of the angle bars 19 and are secured to the adjacent flanges of said angle bars by rivets 23 or in any other suitable manner. The bottom of the truck is provided with a floor 23' consisting of one or more flat metallic plates which rest on the bars 18 and 19 and are secured thereto by a novel form of connecting joint. This joint is clearly shown in Figures 7 to 9 inclusive of the drawings, and said joint is also used for connecting the top bows to the standards as well as the other structural elements of the truck. Before the bars 10 and 17 are assembled, one of the flanges of each bar is formed with a series of spaced vertical slots 24 opening through the top of the flange and with the base of the slots flush with the upper surface of the other flange, as best shown in Figure 7 of the drawings. In assembling the units constituting the body of the truck, the depending flanges 7 of the bows are inserted within the adjacent vertical slots or recesses 24 with the lower edges of said flanges 7 resting on the adjacent flange of the bar 10 opposite the slot. A bolt 25 is then inserted within the groove or channel 9 and through an opening 26 in the bar 10 and fastened with a clamping nut 27 so that the parts are securely locked together. In securing the floor plates 24 in position the bolts 25 are passed through openings in the floor plates and thence through the channels 9 and adjacent structural beam 17 for engagement with clamping nuts, as previously described. It will thus be seen that the bolts 25 at the bottom of the truck not only serve to secure the transverse bars 19 to the longitudinal bars 17 but also serve to secure the floor plates in position. The roof of the truck comprises metallic plates 28 having their adjacent ends overlapped and secured to the bows 6 by means of rivets 29 which pass through openings previously formed in the flanges of the top bows, as best shown in Figure 11 of the drawings. The body of the truck is provided with a rear extension 30 which is bolted or otherwise rigidly secured to the main truck body and at the forward end of said truck body is an inclined portion 31 for the windshield and defining a compartment 32 for the truck driver. The rear extension 30 is preferably inclined with respect to the main body of the truck and is reinforced and strengthened by transversely disposed rear bumper bars 30'. The transverse bars 18 are secured to the longitudinal bars 17 by forming vertical recesses 33 in said longitudinal bars and fitting one of the angle flanges of the adjacent bar 18 therein, the parts being secured together by bolts 34, as best shown in Figure 9 of the drawings.

As a means for securing the truck body in position on the chassis 16, I provide angle bars 35, the upstanding flanges 36 of which are fitted within the channels 20 of the transverse bars 19 and to which they are welded or riveted, as best shown in Figure 4 of the drawings. The horizontal flange of each angle bar 35 is formed with a series of openings 36 adapted to selectively receive a clamping bolt 37, there being a plate or washer 38 interposed between the nut 39 of the bolt 37 and the inner angle of the channel beam constituting the chassis 16 for the purpose of clamping the truck body in position on the chassis. By forming the angle bars 35 with a series of openings the truck body may be secured to a chassis of any desired width and in which position it may be fastened by means of the bolts 37, as will be readily understood. As previously stated, the L bars will be formed with the vertical slots 24 and the floor plates and cover plates with openings for the rivets 29 before the structural units are assembled, and in order to secure the parts together, it is merely necessary to insert the depending flanges of the top bows within the adjacent slots 24 and then pass the bolts 25 through the adjacent channels 9 for engagement with the securing nuts 27 when the parts will be secured together without the employment of rivets or without the necessity of resorting to spot welding. It will, therefore, be seen that the various elements comprising the truck body can be readily assembled and securely united by ordinary laborers, thus dispensing with the employment of skilled mechanics and consequently materially reducing the cost of production. The tie or clamp for fastening the truck body to the chassis is adjustable, the construction thereof being such that the work incident to installation thereof may also be performed by unskilled labor.

In Figure 13 of the drawings, I have illustrated a modified form of standard and top bow construction in which the angle bars 40, instead of being separate and united at spaced intervals by spot welding, are rolled or otherwise formed with an integral transverse connecting web 41 having spaced openings 42 therein for the reception of the securing bolts. It will be understood, however, that, when this type of angle bar is employed, the same form of joint illustrated in Figure 8 will be used for connecting the structural units.

A truck body constructed in accordance with the present invention is not only strong and durable but will effectually resist all crushing strains or stresses to which it may be subjected when in use so that liability of injury to the occupants incident to overturning of the truck or bus is reduced to a minimum.

While the structural steel body is particularly adapted for use on school and other passengers carrying buses, it will, of course, be understood that the same construction may be employed on trucks for hauling merchandise and other commodities without departing from the spirit of the invention.

Having thus described the invention, what is claimed as new is:

1. A vehicle body comprising spaced standards, longitudinal bars connecting the standards, transversely disposed channeled floor beams, the lower ends of the standards being cut away to provide shoulders resting on the transverse channeled floor beams and defining depending fingers extending within the channels of the floor beams, and fastening devices extending through the fingers and channeled beams.

2. A vehicle body comprising spaced standards connected by integral top bows, each standard being provided with an intermediate channel and having its lower end cut away to form transverse shoulders defining depending fingers, transverse floor beams having inner and outer flanges, the inner flanges of each floor beam being parallel and spaced apart to form a channel receiving the depending fingers with the shoulders of the standard resting on the outer flanges of the floor beams, and securing devices extending through the inner flanges of the floor beams and said fingers.

3. A vehicle body comprising a chassis formed of channel iron, floor sills extending transversely of the chassis and provided with channels, standards secured to the floor sills, angularly disposed brackets each having one leg thereof secured within the channel of the adjacent floor sill and its other leg provided with a series of openings, washer plates fitted within the open sides of the channel irons of the chassis, and bolts extending through the openings in the brackets and through said washer plates for securing the floor sills in position on the chassis.

4. In a vehicle body, a chassis, uprights disposed on opposite sides of the body and having their lower ends cut away to form transverse shoulders defining depending fingers, said standards being provided with intermediate channels, longitudinal floor sills mounted on the chassis, transverse floor sills resting on the longitudinal sills and provided with channels receiving the depending fingers of the standards, and fastening devices extending through the transverse floor sills and said fingers.

ALBERT L. LUCE.